United States Patent [19]

Ruben

[11] 4,074,029
[45] Feb. 14, 1978

[54] RECHARGEABLE VOLTAIC CELL WITH LEAD MERCURY AMALGAM ANODE AND LEAD PEROXIDE CATHODE

[76] Inventor: Samuel Ruben, 52 Seacord Road, New Rochelle, N.Y. 10801

[21] Appl. No.: 692,464

[22] Filed: June 3, 1976

[51] Int. Cl.$^2$ .............................................. H01M 6/16
[52] U.S. Cl. .................................. 429/198; 429/203; 429/226
[58] Field of Search ............... 429/228, 198, 218, 203, 429/226, 225

[56] References Cited

U.S. PATENT DOCUMENTS

| | | | |
|---|---|---|---|
| 328,948 | 10/1885 | Kauffer | 429/218 X |
| 2,954,418 | 9/1960 | Ruben | 429/226 X |
| 3,432,349 | 3/1969 | Tragert | 429/218 X |
| 3,462,304 | 8/1969 | Scholzel | 429/218 X |

Primary Examiner—Charles F. LeFevour

[57] ABSTRACT

The invention is a rechargeable voltaic cell in which both the cathodic and anodic reactants are derived from the electrolyte. The cell comprises an anode of lead mercury amalgam, an electrolyte of lead sulfamate and sulfamic acid and a cathodic reactant supported on a stainless steel base.

5 Claims, 1 Drawing Figure

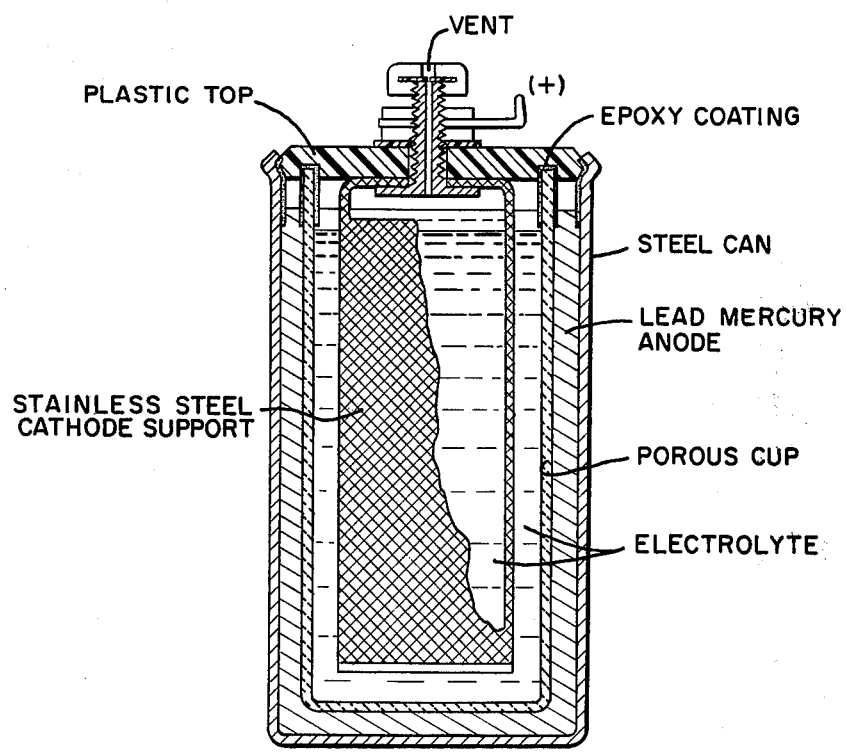

RECHARGEABLE VOLTAIC CELL WITH LEAD MERCURY AMALGAM ANODE AND LEAD PEROXIDE CATHODE

This invention relates to a rechargeable voltaic cell.

It comprises the combination of an anode of lead mercury, amalgam an electrolyte of lead sulfamate and sulfamic acid and a cathodic reactant supported on an electrolyte passive metal, which is preferably a stainless steel screen. When the lead sulfamate is electrolytically decomposed, it deposits on the positively charged electrode, a dense black crystalline appearing lead peroxide which serves as the cathode on discharge.

In my Reissue Patent No. 24,830, dated 31 May 1960, I describe a lead sulfamate-sulfamic acid cell having an anode of carbon or aluminum. This cell has not come into commericial use due to the fact that during operation of the cell, lead in dendritic form is deposited as the anode and soon reaches the cathode, causing the cell of short circuit. While the use of microporous spacers and organic additions to the electrolyte will initially limit the production of a dendritic deposit, the dendritic form of lead deposition returns after a relatively short time. The presence of dendrites inherently limited the use of lead sulfamate as an electrolyte in a reversible cell.

I have found that the formation of short circuiting dendrites can be completely eliminated by use of metallic mercury which, when the cell is charged, combines with lead to form a lead mercury amalgam anode. In a portable cell, this requires that the mercury be contained in a manner that allows maximum electrode area. When the electrolyte of lead sulfamate is used with a mercury electrode, the deposition of lead to the mercury is such that the electro-deposited lead is immediately dissolved by the mercury, forming a mercury amalgam; on discharge, the lead is recombined with the sulfamic acid content to lead sulfamate. The reactions are believed to be as follows:

on charge

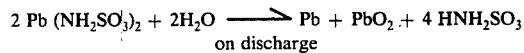

$$2\ Pb\ (NH_2SO_3)_2 + 2H_2O \longrightarrow Pb + PbO_2 + 4\ HNH_2SO_3$$

on discharge

$$PbO_2 + Pb + 4\ HNH_2SO_3 \longrightarrow 2Pb\ (NH_2SO_3)_2 + 2H_2O$$

The electrodeposition obtained on the stainless steel cathode support is 4.5 g of $PbO_2$ per Amp. hr.

The accompanying drawing is a vertical sectional view through a battery embodying the invention.

In order to describe the invention in detail reference is made to the drawing in which the steel can, having a ledge at the top, serves as the negative terminal of the battery. A column of metallic mercury is in contact on one side with the steel can and on the other side with the porous cup molded or formed from a microporous material such as synpor (microporous polyvinyl chloride). The cathode support is a stainless steel screen cylinder which is positioned within but separated from the porous cup. The cylinder is fastened to the polyethylene top by a hollow belt which also serves as a means for adding the lead sulfamate electrolyte. On the open end of the belt is a cap which screws on to the end of the belt and compreses a disc of neoprene or rubber having a pin hole which serves as a vent through the open end of the cap. The top one half inch of the three inch long porous cup is coated with epoxy resin and fits into the groove of the polyethylene top. The resin coating is also used to seal and fasten the porous cup to the plastic top after the stainless steel screen electrode has been fastened to the top.

After the cathode support of stainless steel has been fastened to the top and the cementing of the porous cup have been completed, the cell is assembled by first addind a pre-determined amount of mercury to the can. The porous cup and top assembly are then placed in the can, causing the mercury to rise to the desired height. The porous cup separates the mercury from the electrolyte which is subsequently introduced into the cell and which readily passes through the pores and contacts the mercury. The top of the assembly rests on the ledge of the can, the can being crimped against the top to provide a tight seal. In order to insure the tightness of the seal and prevent passage of any electrolyte to the area above the mercury column, the can has a compressible plastic coating on its top, extending for one half inch. The coating also acts as a grommet to insure a liguid-tight seal.

After crimping of the can to the top, a pre-determined quantity of electrolyte composed of a saturated lead sulfamate solution containing some free sulfamic acid, is injected into the cell through the hole in the bolt. The amount of electrolyte is determined by the height of the column of mercury.

The initial potential of the cell on open circuit is 1.7 volts, its voltage on load being determined by the internal drop of potential. In small cells for use with solid state devices, the potential under load is approximately 1.6 volts.

While lead sulfamate has been found to be a good electrolyte to use in this reversible cell, other lead peroxide depositing electrolytes can be used; buffering agents such as other lead salts may be added to the sulfamate electrolyte.

While stainless steel has been found to be preferable as the cathode support, other suitable metals or alloys may be used, it being essential that the metal be passive to the electrolyte.

The elements and processes described may be embodied in flat type cell structures as well as in the cylindrical form illustrated.

What I claim is:

1. A rechargeable voltaic cell comprising an anode of lead mercury amalgam, an electrolyte of lead sulfamate and sulfamic acid and a cathodic reactant of lead peroxide.

2. A rechargeable voltaic cell comprising an anode of lead mercury amalgam, an electrolyte of lead sulfamate and sulfamic acid, a cathodic reactant of lead peroxide, a micro-porous inert separator permeable to said electrolyte but impermeable to mercury, said separator being in contact with said lead mercury amalgam anode.

3. A rechargeable voltaic cell comprising a metal container constituting the negative terminal of said cell, an anode of lead mercury amalgam, one side of which is in contact with said container, a microporous inert separator in contact with the other side of said lead mercury amalgam electrode, an electrolyte of lead sulfamate and sulfamic acid, a cathodic reactant of lead peroxide supported on a stainless steel screen, said electrolyte permeating the pores of the separator and being in contact with both electrodes.

4. A rechargeable voltaic cell in which both the cathodic and anodic reactants are derived from the electrolyte, comprising a metal container. An anode of lead mercury amalgam in contact with said container, an inert porous cup impermeable to mercury in contact on its outer side with said anode, an electrolyte of lead sulfamate and sulfamic acid, said electrolyte being capable of depositiong lead and lead peroxide, said electrolyte being in contact with the inner side of and permeating said porous cup, and said electrolyte contacting the anode and a cathodic reactant of lead peroxide supported on a metal passive to said electrolyte and in contact therewith.

5. The cell of claim 5 characterized in that the passive metal is stainless steel.

* * * * *